United States Patent [19]
Ellmore

[11] 3,899,726
[45] Aug. 12, 1975

[54] AUTOMATIC REVERSING CONTROL EQUIPMENT

[75] Inventor: John W. Ellmore, West Chester, Pa.

[73] Assignee: Allister Manufacturing Company, Inc., Exton, Pa.

[22] Filed: May 17, 1974

[21] Appl. No.: 470,760

Related U.S. Application Data

[63] Continuation-in-part of Ser. No. 393,283, Aug. 31, 1973, Pat. No. 3,813,590.

[52] U.S. Cl. ............... 318/472; 318/473; 317/13 C
[51] Int. Cl. .............................................. H02h 7/06
[58] Field of Search ............... 318/472, 473, 471; 317/13 B, 13 C

[56] References Cited
UNITED STATES PATENTS

| | | | |
|---|---|---|---|
| 3,036,242 | 5/1962 | MacGregor | 317/13 C |
| 3,258,647 | 6/1966 | Clark | 317/13 C |
| 3,280,373 | 10/1966 | Dabinett | 317/13 C |
| 3,305,698 | 2/1967 | Bargen et al. | 317/13 C |
| 3,457,460 | 7/1969 | Buiting et al. | 317/13 C |
| 3,482,146 | 12/1969 | McMorrow et al. | 318/473 X |

*Primary Examiner*—B. Dobeck
*Attorney, Agent, or Firm*—Synnestvedt & Lechner

[57] ABSTRACT

Control equipment for a reversible electric motor for driving a mechanism such as a garage door operator is disclosed. The control equipment includes a pressure responsive device for moving a movable switch element between first and second motor energizing positions in a circuit. The movable switch element in one of the circuit positions conditions the motor for operation in one direction, and in the other of the circuit positions conditions the motor for operation in another direction. The equipment further includes a relay normally selectively energizable by an operator controlled switch to alternately complete first or second motor energizing circuit paths, depending upon the position of the switch elements, to permit movement of the mechanism in the direction desired. In order to reverse the door when it encounters an obstruction in closing, a circuit is provided to the relay which bypasses the operator controlled switch. The pressure responsive device first operates a bypass switch in the bypass circuit and then moves the aforesaid movable switch element to the one of its positions which conditions the motor for operation in a direction reverse to the direction in which the motor was operating at the time the obstruction was encountered. Simultaneously, the movable switch element closes contacts which complete the bypass circuit, thereby energizing the relay to complete the motor circuit causing the motor to operate in the reverse direction. Means are provided for disabling the bypass switch, thereby preventing energization of the relay via the bypass circuit at the close limit of door travel. First and second thermal cutouts are provided for preventing unduly repetitious operation of the motor and to provide motor protection.

7 Claims, 5 Drawing Figures

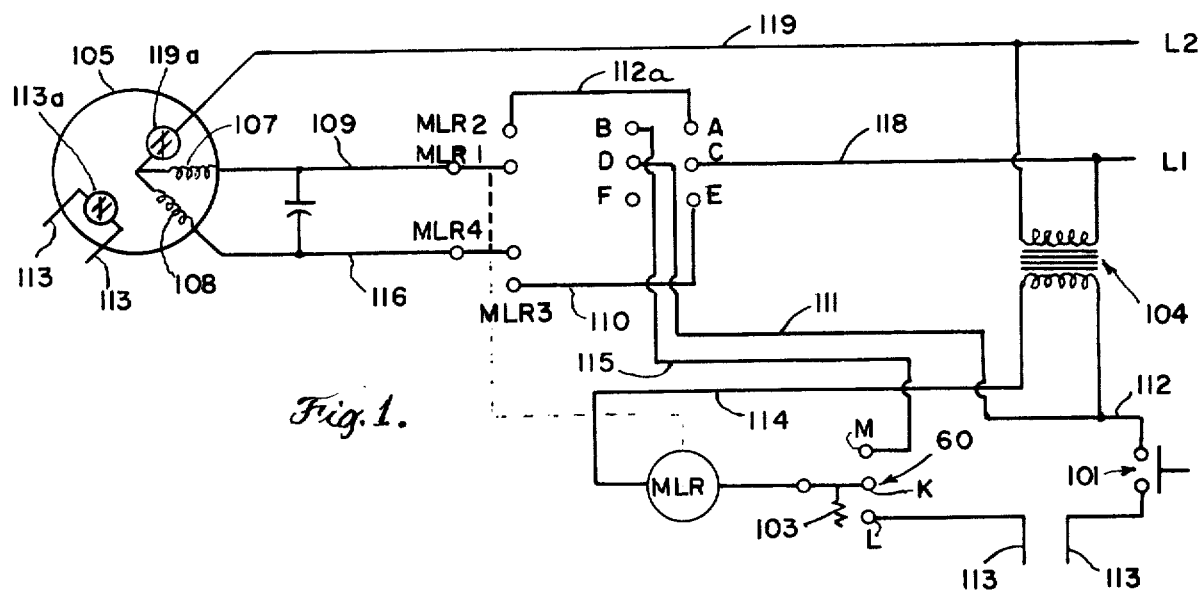
*Fig. 1.*
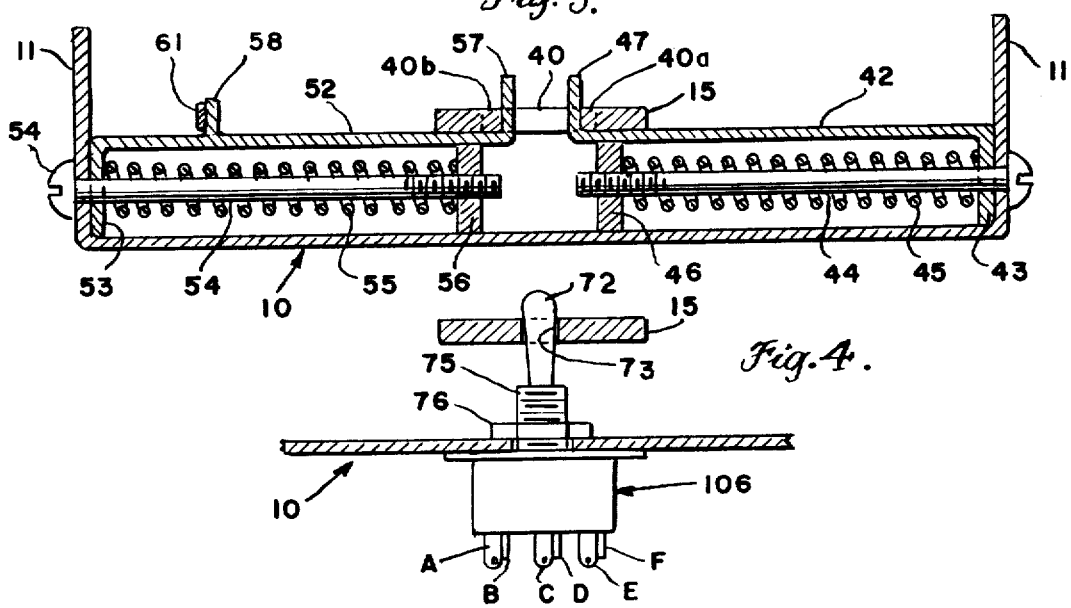
*Fig. 3.*
*Fig. 4.*
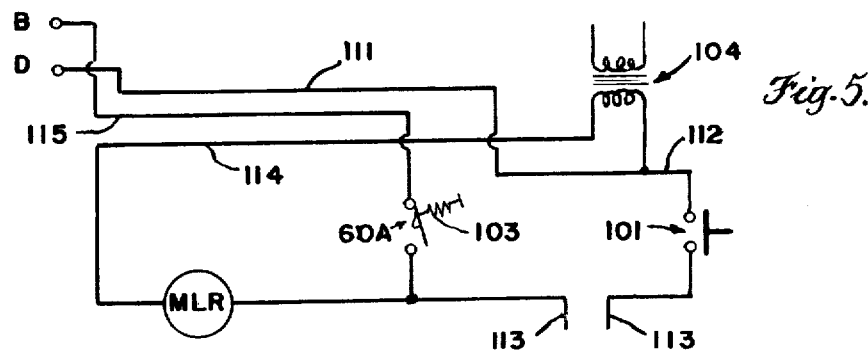
*Fig. 5.*

3,899,726

AUTOMATIC REVERSING CONTROL EQUIPMENT

RELATED CASE

This application is a continuation-in-part of my prior copending application Ser. No. 393,283 filed Aug. 31, 1973 now U.S. Pat. 3,813,590.

BACKGROUND OF THE INVENTION

This invention relates to an automatic reversing control circuit of a reversible electric motor useful, for example, for automatically opening and closing a garage door. More specifically, the invention relates to a control circuit having thermally responsive switches for preventing operation of the control circuitry and motor when the motor becomes overheated because of excessive operation.

A readily apparent danger connected with the use of automatic garage door operators in injury to people, objects or the operating mechanism itself should the door strike an obstruction while being opened or closed. The danger is acute with children who may "play" with the operating device and accidently cause the door to strike and injure either themselves or playmates.

Prior automatic systems have employed a single thermally responsive cut out switch, usually of the automatically resetting type, in the motor to stop movement of the driven element when the motor became overheated by reason of overuse of the motor or a malfunction of the system. However, a danger of these prior systems is that when the temperature limit of the thermal cut out is reached, the driven element, such as a garage door, stops in mid-travel. These arrangements prevent the door from being driven fully to one or the other of its positions and result in unexpected restarts of door movement with consequent danger to persons near the door.

SUMMARY AND OBJECTS OF THE INVENTION

It is an important object of this invention to provide a simplified and reliable means for stopping and reversing a mechanism such as a door operator when the door encounters an obstruction and for preventing unduly repetitious use of the mechanism.

A still further object of this invention is to provide the desired control with a minimum number of circuit components and mechanical parts being required.

It is an object of the invention to provide thermal cut-out means including first and second thermal cutouts for controlling operation of the motor.

The above objects and others are accomplished with control equipment including a pressure responsive device for moving a first switch means, having contact poles, between first and second positions; and a second switch means moved by a selectively energized relay alternately between first and second positions. The first positions of the first and second switch means effect completion of a first motor energizing circuit path which operates the motor in one direction. The second switch positions effect completion of a second motor energizing circuit path which reverses the motor. The control equipment further includes an operator controlled switch for energizing said relay and a bypass circuit for bypassing the operator controlled switch including, in series, a contact pole of said first switch means, the relay and a third switch means; means for holding said third switch means open; and means for disabling said holding means. The holding and disabling means are operatively associated with the pressure responsive means so that movement of the pressure responsive means upon obstruction of door movement closes the third switch means. Movement of the pressure responsive means thereafter moves the first switch means to its second position, thereby completing the bypass circuit to energize the relay to move the second switch means to its second position. This completes the second motor energizing circuit and reverses the motor driven door. Limit members are affixed to the drive mechanism. Means are provided to prevent operation of the third switch means at the close limit of door travel. A first thermal cutout is located in the motor circuit. A second thermal cutout operates at a lower temperature than the first cutout and is located in series with the operator controlled switch.

Further objects and advantages of the present invention will be apparent from the following detailed description of the preferred embodiments thereof made with reference to the accompanying drawings forming a part of the specification and in which:

FIG. 1 is a control circuit diagram illustrating one embodiment of the invention.

FIG. 3 is an enlarged sectional view taken along line 3—3 of FIG. 2;

FIG. 4 is an enlarged sectional view taken along line 4—4 of FIG. 2; and

FIG. 5 is a circuit diagram illustrating a bypass circuit of another embodiment of the invention.

DETAILED DESCRIPTION OF THE PREFERRED EMBODIMENTS

Figure 2:
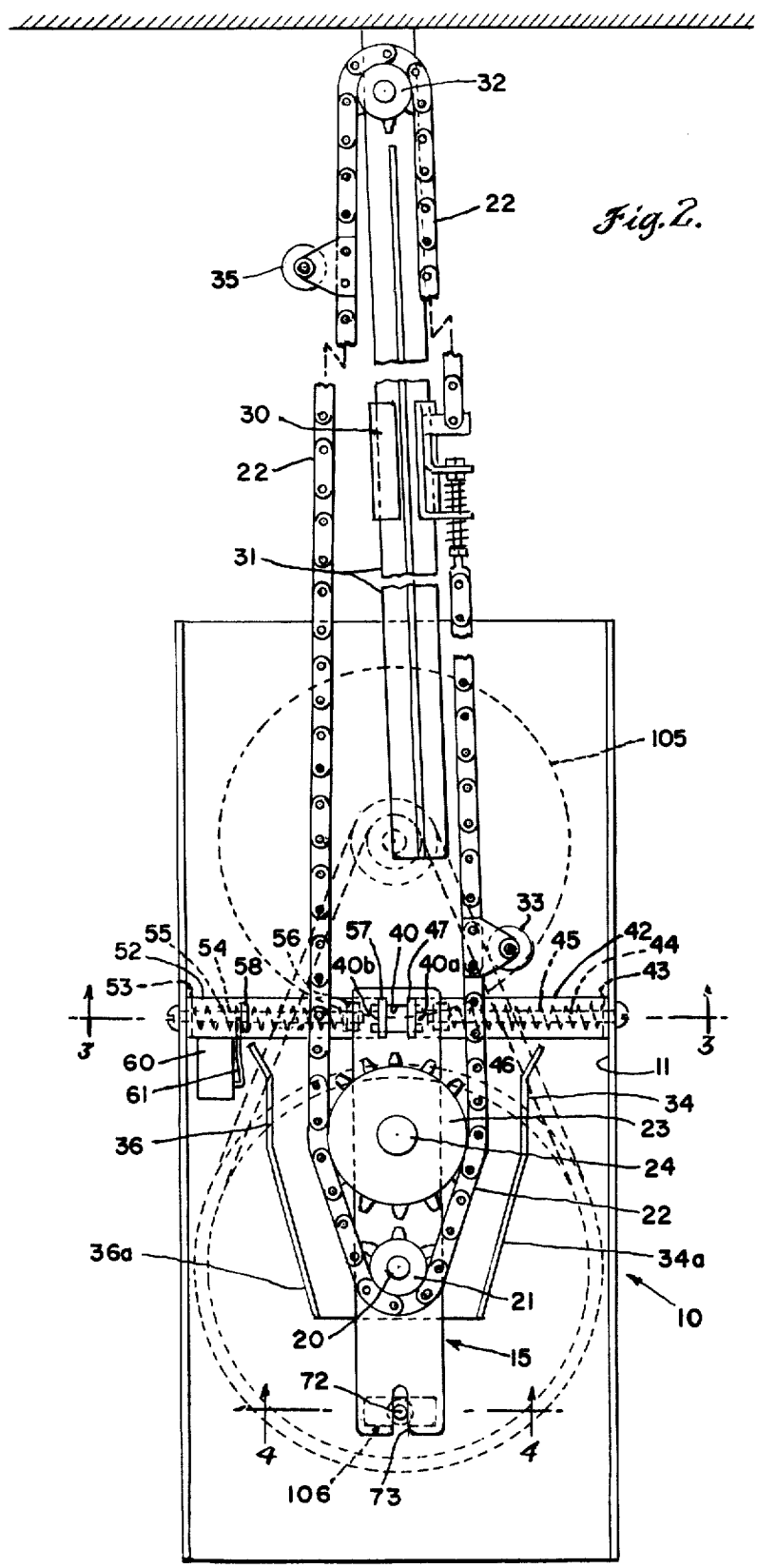
FIG. 2 is a top plan view of door operated pressure responsive equipment for operating components of the control circuit.

Although the invention may be used for other purposes, a preferred application is as a safety device for garage door operators.

Referring now to FIG. 1, there is schematically illustrated two lines L1 and L2 which represent an alternating current power source. A reversible motor 105 which is preferably a three lead, instantly reversible, permanent split capacitor motor having windings 107 and 108, is connected to L2 by lead 119. Current flowing through winding 107 causes the motor to rotate in a direction opposite to the direction of movement when current flows through the winding 108.

In the illustrative embodiment, a first switch means comprising stationary switch contacts A and E and movable contact C of a double pole double throw switch 106 completes circuit paths so that winding 107 or winding 108 may be energized. Second switching means comprised of latching relay MLR having contacts MLR1, MLR2, MLR3, and MLR4 completes a circuit path to the appropriate winding. The path through winding 107 to L1 includes lead 109, contacts MLR1 and MLR2 of latching relay MLR, lead 112, contact A and movable contact C of double pole double throw switch 106, and lead 118. The circuit path through winding 108 to L1 comprises lead 116, contacts MLR4 and MLR3 of latching relay MLR, lead 110, contacts C and E of the switch 106, and lead 118. This arrangement is the reverse of that illustrated in my prior copending application identified above. The objective of this arrangement is to prevent the possibility of arcing, and consequent burnout, of the contacts of switch 106 caused by the discharge of current by the capacitor of motor 105. The above arrangement prevents a discharge through switch 106, thereby allowing the use of less costly switches.

Relay MLR alternately moves contact MLR1 into contact with stationary contact MLR2 or contact MLR4 into contact with stationary contact MLR3, one contact being made upon each energization of coil MLR. The relay coil is in series electrical connection with a selectively energizable operator controlled switch 101 operable manually or by remote control via a circuit including leads 113, thermal switch 113a, bypass switch 60 in a first operative position in which its contacts K and L are in electrical connection, lead 114, the secondary of transformer 104 and lead 112.

A bypass circuit provides an alternate circuit path to relay MLR in accordance with the invention and includes the above-mentioned bypass switch 60 in a second operative position in which its contacts K and M are electrically connected, lead 114 and the secondary of transformer power source 104, lead 111, movable contact D and stationary contact B of the double pole double throw switch 106. In the embodiment of FIG. 1, the bypass switch 60 is biased to its second operative position but is held in its first operative position in which the alternate circuit path is open and the coil of latching relay MLR can be energized by switch 101. The conditions under which the switch 60 is moved to the position in which the alternate circuit path is closed will be described hereinafter.

As shown in FIG. 2, pressure responsive means associated with the door or other motor driven mechanism is provided for controlling the position of contacts C and D of first switch means 106, and for causing third or bypass switch means 60 to assume first or second operative positions.

A housing 10 shown in FIG. 2 is typically mounted on the ceiling adjacent the door and houses the reversible electric motor, various circuitry and accessories such as a radio control receiver, electrical outlets, light fixtures, etc. Looking down upon the top of housing 10, there can be seen the pressure responsive means preferred for use in the practice of the invention.

The pressure responsive means preferably comprises a pivotal member or lever 15 mounted on motor driven drive shaft 20 for pivotal movement with respect thereto. A toothed drive sprocket 21 is keyed or otherwise secured to the shaft 20 adjacent the pivotal member. Drive sprocket 21, in turn, drives a continuous flexible drive member such as roller chain 22. Chain 22 passes over a load or pressure sensing idler sprocket 23 rotatably mounted on shaft 24 affixed to pivotal member 15. The load sensing idler sprocket 23 has a larger diameter than drive sprocket 21.

A carrier 30 rides upon a guide rail 31 and is attached to the chain 22 for movement thereby. The carrier 30 is normally connected to the garage door by linkage means (not shown). Limit rollers 33 and 35 are also attached to chain 22 for purposes to be described hereinafter. Chain 22 and components added thereto form a continuous loop with chain 22 rotating freely about a pulley 32 typically affixed to the garage wall above the garage door opening.

Pivotal movement of the lever member about the motor shaft 20 results whenever an obstruction is encountered by the drive system. When the chain is traveling in the counterclockwise direction as viewed in FIG. 2 and an obstruction is encountered, a force will be exerted by the chain against the lefthand side of idler sprocket 23 as the drive sprocket 21 tensions the chain when it attempts to rotate further in the counterclockwise direction. This force causes clockwise pivotal movement of the lever about the shaft 20. Conversely, when the chain encounters an obstruction when it is moving in a clockwise direction, drive sprocket 21 exerts a tension on the righthand portion of the chain causing a force to be exerted against the righthand side of the idler sprocket thereby pivoting the lever 15 in the counterclockwise direction. The purpose of this will become apparent hereinafter.

Means including camming plates or tracks stop the door at each of its limits of travel. Camming plate 34 is positioned to receive limit roller 33 as the door approaches one limit of travel. The camming plate is provided with an inclined portion 34a onto which the limit roller 33 rides causing pivotal movement of the lever 15 at the limit of movement of the door. Camming plate 36 is also provided with an inclined portion 36a and is positioned to receive the limit roller 35 as the other limit of travel is approached. At the limit of travel, limit roller 35 moves onto the inclined portion 36a of the camming plate 36 and when it does this causes pivotal movement of the lever 15 in a clockwise direction.

The pressure responsive means further includes biased follower members for urging pivotal member 15 to the central position shown in FIGS. 2 and 3. The biased follower members preferably include arm 42 having an upturned flange 47 at its inner end and arm 52 having an upturned flange 57 at its inner end. The arms are movably connected to pivotal member 15 by connecting means such as spaced tabs 40a and 40b provided in the rectangular opening 40 of the pivotal member 15.

Referring to FIG. 3, follower member 42 includes a flange 43. A rod or bolt 44 passes through a hole in wall 11. A spring 45 fitted onto the shank of bolt 44 is retained by nut 46. Spring 45 bears against the flange 43. Follower member or arm 52 is biased by a spring 55 which fits on the shank of bolt 54 between flange 53 and a nut 56.

As can be seen in FIGS. 3 and 4 the pivotal member 15 operates the first switch means 106 by means of a slot 73 which receives toggle element 72. The switch 106, as illustrated in FIG. 4, is secured underneath the pivotal element 15 by means of threaded neck 75 and threaded collar 76. The toggle element 72 is part of the movable element of the double pole double throw switch means 106.

It should be readily apparent that the pivoting of member 15 clockwise will throw toggle 72 to the left and that the counterclockwise pivoting of member 15 will throw toggle 72 to the right; thereby effecting movement of the movable element of the double pole double throw switch 106.

In the embodiment of FIG. 1, the third switch means comprises bypass switch 60 which is a snap action single pole double throw switch, located adjacent the arm 52. A switch operating arm 61, spring biased to its second operative position with contacts K and M in contact in the absence of restraint, is normally held in its first operative position by holding means comprising a projection 58 on arm 52 as can be seen in FIG. 3.

When pivotal member 15 rotates clockwise, it moves arm 52 to the right via tab 40b and projection 57. Projection 58 on the arm 52 also moves out of contact with switch arm 61, allowing the switch 60 to assume its second operative position. Because the switch 60 is located at a point more remote from the pivotal axis of member 15 than the toggle switch 106, switch 60 will assume its second operative position before switch 106 is thrown. It should also be noted that when pivotal member 15 rotates in the counterclockwise direction from the central position, projection 58 does not move away from switch arm 61.

Motor 105 is provided with a normally closed thermal switch 119a of the resetting type which is positioned to sense the temperature of the motor. Switch 119a opens at a preselected temperature, in the event a malfunction in the mechanism occurs which causes the motor to overheat. A feature of the invention is the provision of a second normally closed thermal switch 113a of the resetting type which is also positioned to sense the temperature of the motor. Switch 113a is in series circuit relationship with switch 101. Thermal switch 113a is set to open at a temperature somewhat below the operating temperature of thermal switch 119a. Switch 113a opens to prevent operation of the motor by switch 101 when the temperature of the motor reaches the operating temperature of the thermal switch. The importance of this feature of the invention arises when the push button switch 101 is operated several times in a short period of time. Operation of the thermal switch 113a prevents further operation of the relay MLR by switch 101 until the motor has cooled down sufficiently. The temperature differential between switches 113a and 119a is such that there is sufficient time between the opening of switches 113a and 119a to allow the door to be driven to one or the other of its limits of travel, usually about twelve seconds for residential systems. Thus, if thermal switch 113a opens while the door is in mid-travel, the door will continue to move to its limit of travel, unless a condition of genuine emergency which would also open thermal switch 119a has been created. However, until the thermal switch 113a resets, the system cannot be set in motion by switch 101.

A brief explanation of the functioning of the motor control equipment of the present invention will now be given with an arbitrary starting point being with the door in the fully closed position. When the garage door is closed the movable contacts C and D are in contact with stationary posts A and B, respectively; the movable relay contact MLR4 is in contact with contact MLR3; and contact K is in contact with stationary contact L of the bypass switch 60. When selectively energizable switch 101 is momentarily closed, lead 112 is in electrical connection with lead 113, coil MLR and lead 114 and coil MLR of the latching mechanical relay is energized. Movable relay contact MLR1 is thereby brought into contact with stationary contact MLR2. MLR4 disconnects from MLR3. Thus a circuit is closed comprising L1, lead 118, contacts C and A, lead 112a, contacts MLR2 and MLR1, lead 109, winding 107, lead 119, and L2. The energized motor operates to drive chain 22 in FIG. 2 in a clockwise direction so that the door begins to open. The opening door may be stopped by again depressing switch 101 which causes the movable contact MLR1 to disengage from contact MLR2 and make movable contact MLR4 with stationary contact MLR3, thus interrupting the motor circuit and causing the door to stop.

To close a fully opened and stopped garage door, switch 101 is momentarily closed to energize latching relay MLR causing movable contact MLR1 to be switched from stationary contact MLR2 and movable contact MLR4 to close to stationary contact MLR3. This completes a circuit from L1, comprising lead 118, contacts C and E, lead 110, contacts MLR4 and MLR3, lead 116, motor winding 108, lead 119, to L2. The now energized motor rotates in a direction opposite to the previous direction; that is, chain 22 (FIG. 2) is driven in a counterclockwise direction so as to close the door. During closing, if switch 101 (FIG. 1) is momentarily closed to cause movable contact MLR4 to move from stationary contact MLR3 and movable contact MLR1 to close to stationary contact MLR2, the door closing circuit is interrupted causing the door to stop.

At fully opened and closed door positions, the motor automatically stops when the appropriate limit roller 33 or 35 engages the corresponding limit cam 34 and 36, mechanically pivoting member 15 as above described. Pivoting member 15 moves toggle 72 and moves the contacts C and D from one position to the other, thereby breaking the motor energizing circuit and stopping the motor.

When the door encounters an obstruction intermediate its limits of travel, the following sequence takes place. Assuming that the garage door is closing, if an obstruction is met by the closing door, the lefthand part of the counterclockwise rotating chain (as viewed in FIG. 2) undergoes an increase in tension and exerts an increased load against idler 23 causing member 15 to pivot in a clockwise direction about drive shaft 20. The clockwise rotation of member 15 moves contact D of switch 106 against contact B and contact C against contact A causing the motor to momentarily stop. However, prior to this, rotation of the member 15 has caused projection 58 on arm 52 to move out of contact with arm 61 of switch 60 thereby allowing movable contact K to move into contact with stationary contact M of switch 60, thus closing the bypass circuit. Relay MLR is then energized since the bypass circuit is completed by means of lead 115, contacts K-M, the coil of latching relay MLR, lead 114, the secondary of transformer 104 and lead 111. Energizing the coil of latching relay MLR causes contact MLR4 to move from stationary contact MLR3 and MLR1 to move to stationary contact MLR2. A circuit is now completed from L1, comprising lead 118, lead 112, lead 109, motor winding 107 and lead 119 to L2 so that the motor reverses and the door moves to the full open position where it automatically stops as described previously.

An aspect of the invention is that means are provided to disarm the switch 60 when the lever 15 pivots when the door is in full closed position. To accomplish this, the end of down limit cam 36 is made sufficiently flexible so that as the down limit roller 35 engages the down limit cam 36, the cam flexes outwardly holding the switch in its first condition with contact K against contact L.

If the door encounters an obstruction while opening, the righthand part of the rotating chain (as viewed in FIG. 2) is tensioned and causes the member 15 to pivot in a counterclockwise direction moving contacts C and D against contacts E and F. This breaks the circuit to the motor winding automatically stopping the motor and door. During this time switch 60 is held in its first operative position since extension 58 of arm 52 remains in contact with extension 61. Momentary closing of switch 101 will energize coil MLR to bring contact MLR4 into contact with contact MLR3. The door closing circuit previously described is completed and the door is lowered away from the obstruction encountered in opening.

In a second embodiment of the invention, which may be preferable under certain conditions of use of the invention, the switch 60 is replaced with a normally closed switch 60A that is held open as shown in FIG. 5. FIG. 5 depicts a bypass circuit utilizing such a normally closed switch 60A. The bypass circuit performs all of the functions of that in FIG. 1 except that the operator controlled switch 101 is not isolated from the coil MLR when the bypass circuit closes. In cold climates where a layer of ice and snow several inches thick might accumulate in the path of an open door, push buttom switch 101 is not disabled when an obstruction is encountered so that the embodiment of FIG. 2 gives the operator the freedom to override the automatic reversing feature and stop the door when such an accumulation is encountered.

I claim:

1. A drive system including a reversible motor for driving an element between limit positions, and a control circuit for the motor comprising
   a power supply circuit for supplying power to the motor, a switch means in the supply circuit for controlling the supply of power to the motor, a control circuit for controlling the switch means, the control circuit including an actuating switch for controlling the operation of the switch means, a first thermal switch which opens in response to an increase in the operating temperature of the motor above a first predetermined temperature for disabling the actuating switch, and a second thermal switch which opens in response to an increase in operating temperature of the motor above the first predetermined temperature for interrupting the supply of power to the motor.

2. Apparatus as in claim 1 wherein the switch means comprises a latching ralay.

3. Apparatus as in claim 1 wherein the first thermal switch is in series circuit relationship with the actuating switch.

4. A drive system comprising a reversible electric motor having a pair of windings and capacitance means for determining the direction of rotation of the motor, a first switch for energizing the windings including first contact means for energizing the windings in a manner to cause rotation of the motor in one direction and second contact means for energizing the windings in a manner to cause rotation of the motor in the other direction, a second switch for supplying power from a supply source alternatively to the first and second contact means of the first switch, an actuating means for controlling the first switch, first thermally responsive means for disabling the actuating means in response to a rise in temperature of the motor above a predetermined temperature, and a second thermally responsive means for interrupting the supply of power to the motor in the event the temperature of the motor rises above said predetermined temperature.

5. Apparatus as in claim 4 wherein the first switch means is a latching relay.

6. Apparatus as in claim 5 wherein the second switch is a double pole double throw switch.

7. Apparatus as in claim 4 wherein the first thermally responsive means is a thermal switch in series circuit relationship with the actuating switch.

* * * * *

UNITED STATES PATENT AND TRADEMARK OFFICE
CERTIFICATE OF CORRECTION

PATENT NO. : 3,899,726
DATED : December 5, 1975
INVENTOR(S) : John W. Ellmore

It is certified that error appears in the above—identified patent and that said Letters Patent are hereby corrected as shown below:

Column 1, line 11, change "of" to --for--.
Column 1, line 19, change "in" to --is--.

Signed and Sealed this sixteenth Day of March 1976

[SEAL]

Attest:

RUTH C. MASON
Attesting Officer

C. MARSHALL DANN
Commissioner of Patents and Trademarks